United States Patent
Rickard et al.

(10) Patent No.: US 7,085,501 B1
(45) Date of Patent: Aug. 1, 2006

(54) COHERENT OPTICAL RECEIVER

(75) Inventors: Robin P Rickard, Spellbrook (GB); Richard Epworth, Sawbridgeworth (GB); Seb J Savory, Cambridge (GB)

(73) Assignee: Nortel Networks Limited, St. Laurent (CA)

( * ) Notice: Subject to any disclaimer, the term of this patent is extended or adjusted under 35 U.S.C. 154(b) by 627 days.

(21) Appl. No.: 10/180,568

(22) Filed: Jun. 26, 2002

(51) Int. Cl.
*H04B 10/06* (2006.01)

(52) U.S. Cl. ........................ 398/202; 398/204

(58) Field of Classification Search ................ 329/306; 398/203, 204, 207, 202
See application file for complete search history.

(56) References Cited

U.S. PATENT DOCUMENTS 5,237,287 A * 8/1993 Bar-David .................. 329/308

OTHER PUBLICATIONS

Nicholson, G. et al. "Performance Analysis of Coherent Optical Phase-Diversity Receivers with DPSK Modulation," Journal of Lightwave Technology, vol. 7, No. 2, Feb. 1989, pp. 393-399.*

Yamashita, "Two-Branch Double-Stage Phase-Diversity (DSPD) Coherent Receiver Using a 3×3 Fiber Coupler", IEEE PHotonics Technology Letters, vol. 6, No. 11, Nov. 1994, pp. 1385-1388.

Derr, "Coherent Optical QPSK Intradyne System: Concept and Digital Receiver Realization", Journal of Lightwave Technology, vol. 10, No. 9, Sep. 1992, pp. 1290-1296.

* cited by examiner

*Primary Examiner*—Christina Y. Leung
(74) *Attorney, Agent, or Firm*—Barnes & ThornburgLLP

(57) ABSTRACT

A coherent optical intradyne receiver is described which comprises an optical image reject mixer capable of dividing, mixing and recombining signals from three inputs so as to produce an inphase and a quadrature channel. On each of the channels a same set of image products is cancelled and from which channels, phase modulated signals can be recovered.

17 Claims, 4 Drawing Sheets

COHERENT OPTICAL RECEIVER

This invention relates generally to the field of coherent optical receivers and methods of implementing same, and more particularly to intradyne receivers utilising three fibre couplers.

Historically, transmitted optical signals were modulated by signals that change their amplitude or intensity. This had the benefit of being a straightforward approach, where WDM (wave division multiplexing) was possible, but had the disadvantage that the capacity was limited as only a limited number of channels could fit into the passband of an IMDD (intensity modulation direct detector).

Coherent detection of phase modulated optical signals offers an advantage in terms of required OSNR (optical signal to noise ratio) over directly detected intensity modulated signals of an equivalent spectral efficiency. There are two conventional methods of implementing a coherent optical receiver, namely homodyne and heterodyne receivers.

The optical homodyne receiver is theoretically most straightforward. An OLO (optical local oscillator) is phase locked to the recovered carrier so that the optical signal is directly converted to baseband. However, problems associated with the control of the laser mean that this is extremely difficult to implement in practice.

In an optical heterodyne receiver, the OLO is offset in frequency from the received signal so that it is outside the signal bandwidth. Image frequencies generated by mixing can then be removed by optical filtering ("image rejection"). This results in a requirement for an electrical bandwidth at the first IF (intermediate frequency) which is more than twice that required for the homodyne receiver and which may exceed the limits of available devices.

An intradyne receiver overcomes some of the shortcomings of the homodyne and heterodyne approaches. In an intradyne optical receiver, the optical local oscillator has a frequency within the signal bandwidth but (unlike the homodyne approach) it is not phase locked to the original carrier. This eliminates the need for a complex control loop around the laser and a much narrower IF bandwidth is required as compared to the heterodyne approach. However, conventional image rejection is not possible since optical filters are ineffective when the IF spectrum consists of two almost superimposed spectra.

A known image reject architecture for an intradyne receiver employs parallel quadrature signal paths which are mixed with local oscillators also in quadrature and then recombined such that one set of image components is cancelled. This approach requires that the parallel signal paths are closely matched in amplitude and phase to achieve the required degree of cancellation. It is difficult to maintain this degree of match between channels over a wide frequency band if the paths are not identical to each other in terms of the components contained therein.

A coherent optical intradyne system is described in Derr et al, Journal of Light Wave Technology, Vol. 10, No. 9, September 1992. This paper describes a receiver based on QPSK (quadrature phase shift keying) with a digital realisation of synchronous demodulation including phase synchronisation. This approach could, in principle, overcome the problem of matching channels, but is limited by the availability of sufficiently fast low cost digital electronics and analogue to digital converters.

The use of a three fibre coupler is an attractive way of combining an optical local oscillator with a received signal. However, in order to generate two components in quadrature with the signals on one output of the coupler, it is necessary to subtract one of the signals on the other two outputs from the other. This results in an asymmetry between the in-phase and quadrature paths, since the in-phase path does not undergo this operation.

A coherent intradyne optical receiver is described in Yamashita S, —IEEE Photonics Technology Letters, Vol 6, No 11, November 1994. This receiver utilises a three-fibre coupler (the "3×3 fiber coupler" described therein), in which only two of the three outputs ("beat signals") are used as described with reference to FIG. 1 of Yamashita. This approach has the limitation that it cannot detect two orthogonal phase channels, since only a single channel is produced at the intermediate frequency (IF). Hence a QPSK modulated signal cannot be recovered.

SUMMARY OF THE INVENTION

According to a first aspect of the invention there is provided a coherent optical intradyne receiver comprising an optical image reject mixer capable of dividing, mixing and recombining signals from three inputs so as to produce an inphase and a quadrature channel, on each of which channels a same set of image products is cancelled and from which channels, phase modulated signals can be recovered. The use of three identical parallel paths means that they can be combined together to cancel the unwanted image components so that image rejection can be implemented in an intradyne receiver, thus avoiding the above-described disadvantages of homodyne and heterodyne receivers.

Preferably, the receiver further comprises a three fibre coupler, at which an optical signal can be received and from which three outputs are obtained, said three outputs comprising the inputs to the optical image reject mixer.

According to a second aspect of the invention there is provided an image reject mixer suitable for a coherent optical intradyne receiver as described above, comprising
  means to divide each of three detected inputs into two signal paths;
  a local oscillator;
  six four quadrant mixers, at each of which one of the six signal paths is mixed with one of six outputs from said local oscillator so as to create phase differences between said six signal paths;
  means to combine the six signal paths in two groups of three so as to create an inphase channel and a quadrature channel;
  means to demodulate phase modulated signals from said inphase and quadrature channels.

Preferably, the three detected inputs comprise three outputs of a three fibre coupler. Further preferably, said phase differences are substantially 0, 120, and −120 degrees on an inphase arm and substantially 90, 210 and −30 on a quadrature arm. Advantageously, said phase modulated signals are BPSK or QPSK modulated signals.

According to a third aspect of the invention there is provided a method of image rejection in an intradyne coherent optical receiver comprising the steps of:
  dividing each of three detected inputs into two signal paths;
  mixing each of the six signal paths with one of six outputs from a local oscillator so as to create phase differences between said six signal paths;
  combining the six signal paths in two groups of three so as to create an inphase channel and a quadrature channel;
  demodulating phase modulated signals from said inphase and quadrature channels.

Preferably, the three detected inputs comprise three outputs of a three fibre coupler.

According to a fourth aspect of the invention there is provided an image reject mixer suitable for a coherent optical intradyne receiver described above, comprising
- a differential amplifier to combine two of three detected inputs into one signal path;
- means to divide each of the signal path from said differential amplifier and the remaining detected input into two signal paths;
- a local oscillator;
- four mixers, at each of which one of the four signal paths is mixed with one of four outputs from said local oscillator so as to create phase differences between said four signal paths;
- means to combine the four signal paths in two groups of two so as to create an inphase channel and a quadrature channel;
- means to demodulate phase modulated signals from said inphase and quadrature channels.

Preferably, the three detected inputs comprise three outputs of a three fibre coupler. Further preferably, said phase modulated signals are BPSK or QPSK modulated signals.

Other aspects and features of the invention will become apparent to those ordinarily skilled in the art upon review of the following description of specific embodiments of the invention in conjunction with the accompanying Figures.

BRIEF DESCRIPTION OF THE DRAWINGS

Preferred embodiments of the invention will now be more particularly described, by way of example only, with reference to the accompanying Figures, in which.

DETAILED DISCLOSURE OF PREFERRED EMBODIMENTS

Figure 1:
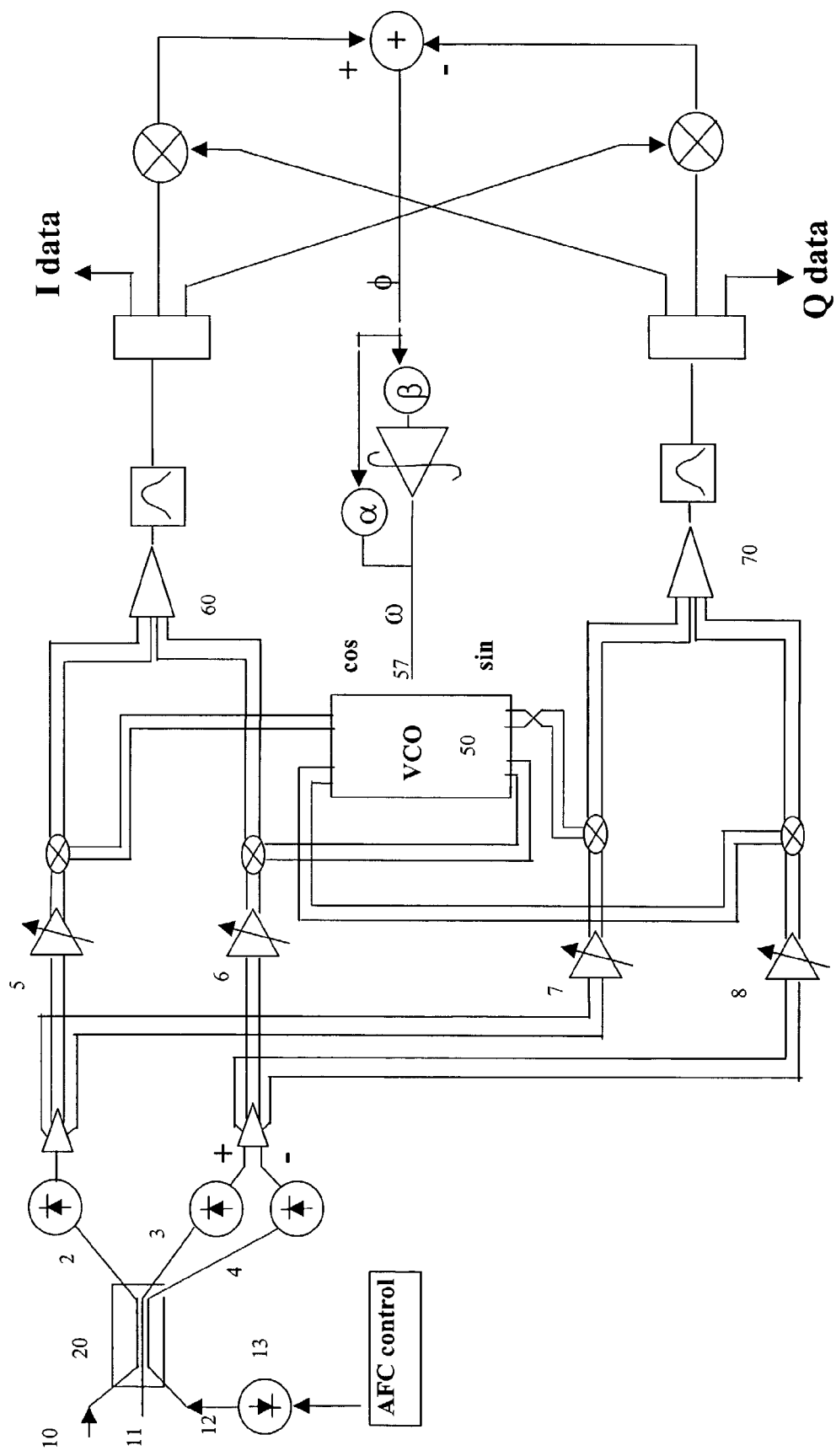
FIG. 1 is a schematic representation of a coherent optical receiver embodying one aspect of the invention.

Referring to FIG. 1, a coherent intradyne receiver is illustrated which embodies one aspect of the invention.

The receiver signal arrives at a first input port 10 of a three fibre coupler 20. The second input port 11 of the three fibre coupler 20 is not connected. The third input port 12 is connected to an optical local oscillator (OLO) 13 which is locked in frequency to the recovered carrier (as described in more detail below).

The three outputs of the three fibre coupler 20 pass through three detector diodes as illustrated. The three fibre tails 2, 3, 4 are matched in length to a fraction of baseband frequency so that the vector processing assumes minimum phase errors.

Having passed through the detector diodes, two of the three signal paths are combined using a differential amplifier so that the resulting two signal paths can be divided into four signal paths 5, 6, 7, 8.

Each of the four signal paths 5, 6, 7, 8 passes through a four quadrant mixer where the respective signal path is mixed with one of four outputs from an electrical local oscillator 50. The electrical local oscillator 50 is preferably a voltage-controlled oscillator, although in an alternative embodiment (not illustrated) it may be implemented by direct digital synthesis (DDS) with consideration given to minimising pipeline delay.

After leaving the mixers, the four signal paths are combined in two groups of two resulting in an inphase channel 60 and a quadrature channel 70. On both the inphase and quadrature channels, the same set of image products from the mixing process is cancelled, although, the cancellation (i.e., image rejection) is not exact owing to the difference in operations carried out on the three fibre outputs 2, 3, 4 of the coupler 20.

Figure 2:
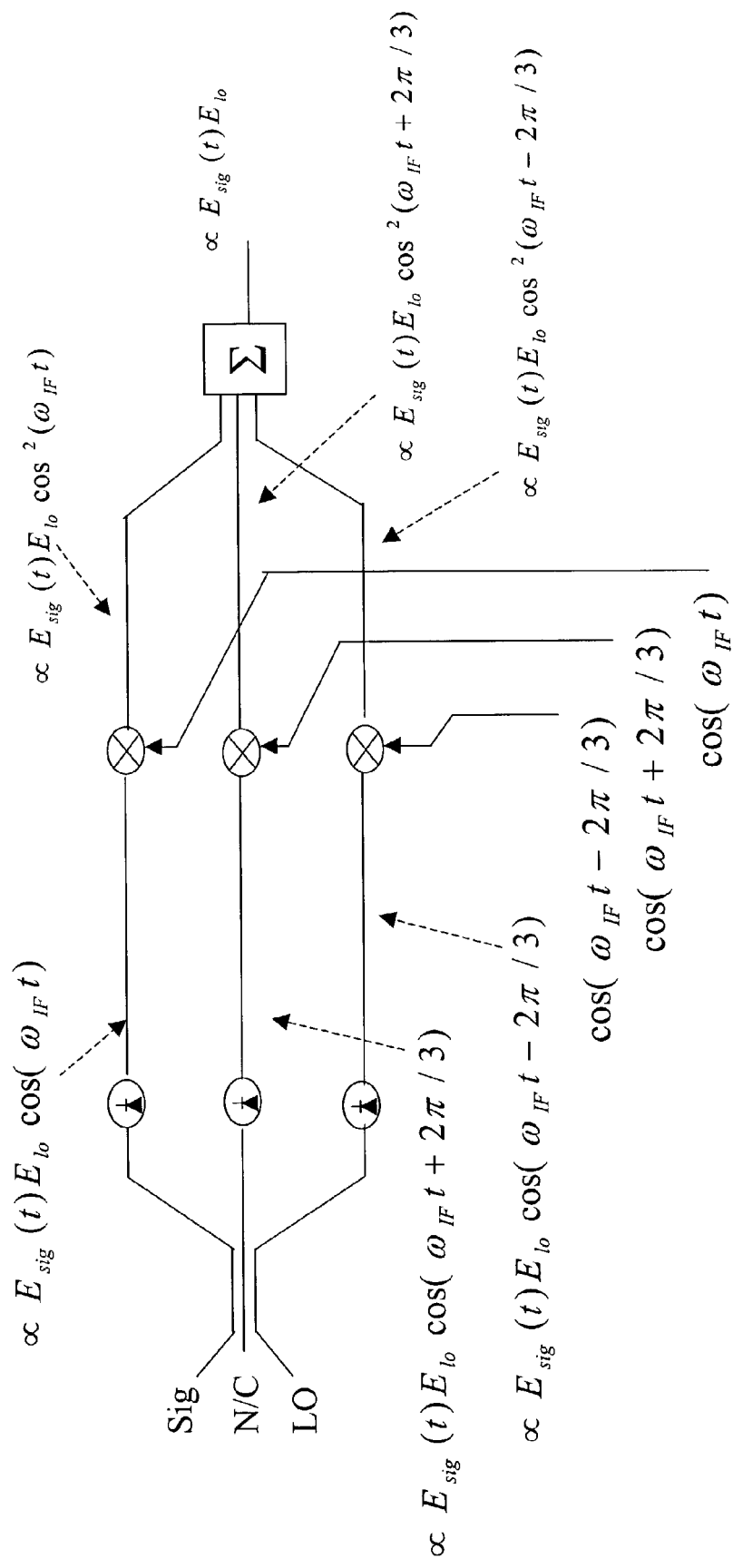
FIG. 2 is a schematic representation of the principle involved in an alternative embodiment of a coherent optical receiver (inphase arm shown only)

FIG. 2 shows how the three outputs of a three fibre coupler can be utilised to effect image rejection with three identical channels (in terms of components and processing operations) which will optimise channel matching.

Figure 3:
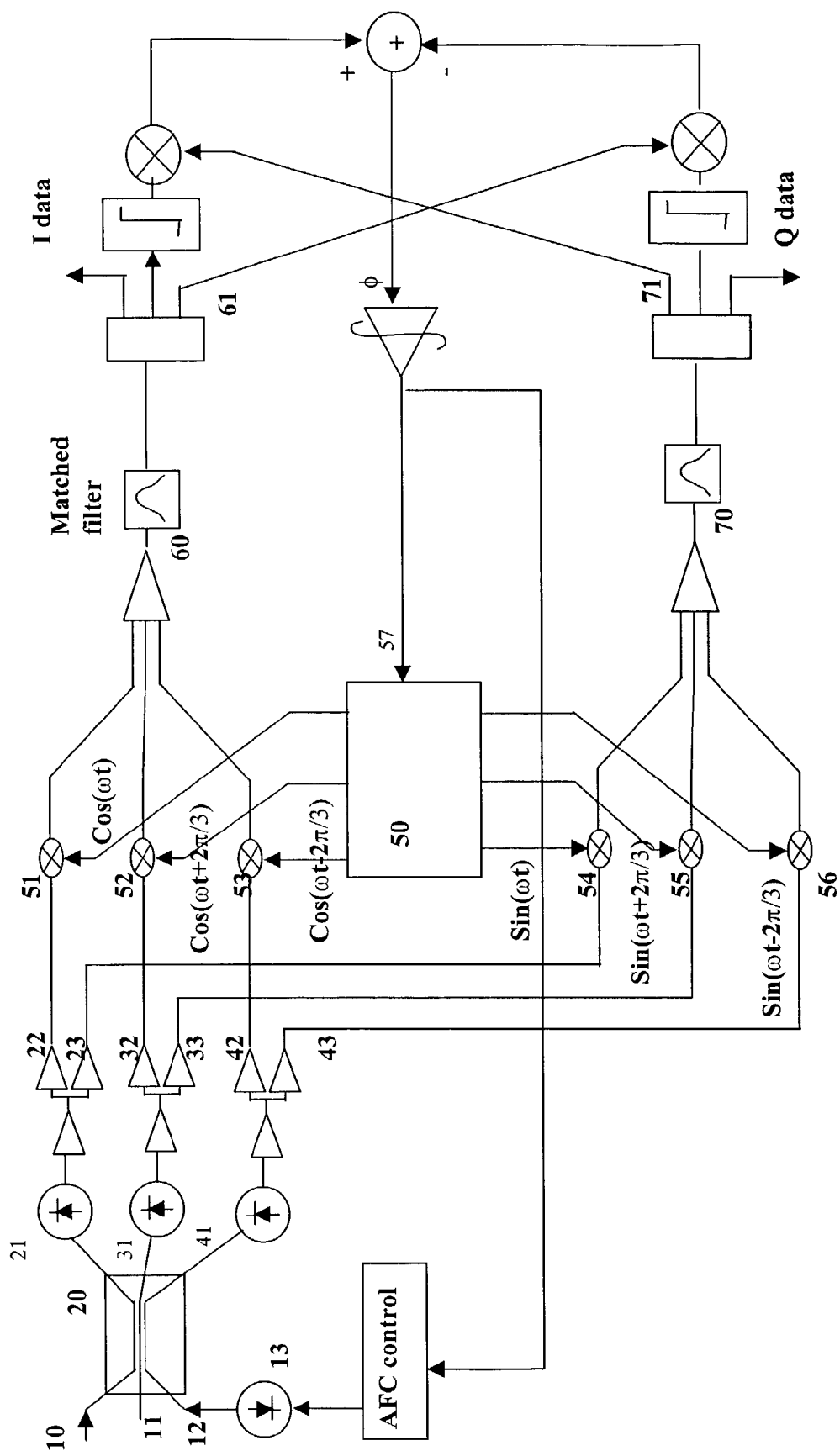
FIG. 3 is a schematic representation of an alternative embodiment of a coherent optical receiver, whose principle is illustrated in FIG. 2.

Referring to FIG. 3, a preferred embodiment of the coherent optical receiver is shown which utilises the principle illustrated in FIG. 2. The receiver is an intradyne receiver having a three fibre coupler and utilising image rejection.

The received signal arrives at a first input port 10 of a three fibre coupler 20. The second input port 11 of the three fibre coupler 20 is not connected. The third input port 12 is connected to an optical local oscillator (OLO) 13 which is locked in frequency to the recovered carrier (as described in more detail below).

The three outputs of the three fibre coupler 20 pass through three detector diodes 21, 31, 41 respectively and then each diode output is split into two to provide a total of six parallel signal paths 22, 23, 32, 33, 42, 43.

Each of the six signal paths 22, 23, 32, 33, 42, 43 passes through a four quadrant mixer (51, 54, 52, 55, 53 and 56 respectively), where the signal path is mixed with one of six outputs from an electrical local oscillator 50.

The six outputs of the electrical local oscillator are arranged with a relative phase difference of 0, 120 and −120 degrees on the inphase arm (mixers 51, 52, 53) and of 90, 210 and −30 degrees on the quadrature arm (mixers 54, 55, 56). The phase differences are indicated in FIG. 3.

After leaving the mixers, the six signal paths are combined in two groups of three resulting in an inphase channel 60 and a quadrature channel 70. On both the inphase and quadrature channels, the same set of image products from the mixing process is cancelled. Phase modulated signals, typically BPSK or QPSK can then be demodulated from the inphase and quadrature baseband outputs. In the case of BPSK modulated signals, only the inphase channel carries data.

The electrical local oscillator 50 is a voltage controlled oscillator, which is preferably implemented by analogue techniques in order to reduce delay in the control characteristic, or which could be implemented by direct digital synthesis, provided attention is given to minimising pipeline delay. The carrier is recovered for control of the electrical local oscillator 50, preferably by a Costas loop fed from the inphase and quadrature baseband outputs (61, 71), although other techniques, such as a squaring loop could be used.

Figure 4:
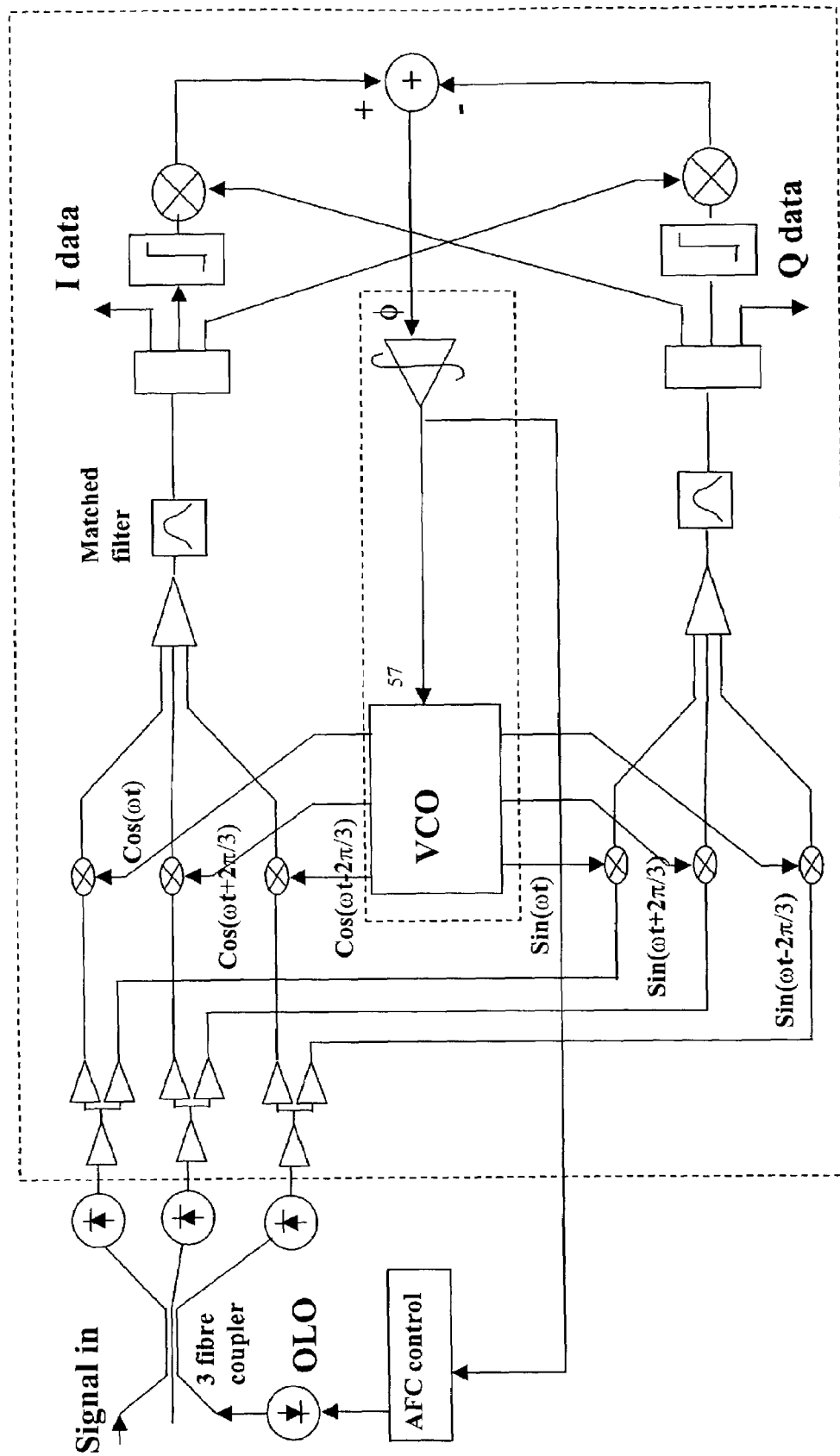
FIG. 4 is a schematic representation of the receiver of FIG. 3 implemented as an MMIC (monolithic microwave integrated circuit).

As mentioned above, the OLO 13 is locked in frequency to the recovered carrier via the Costas loop. The "AFC control" indicated in FIGS. 1, 3 and 4 represents an automatic frequency control circuit which controls the frequency of the OLO 13 so that it closely follows the frequency of the unmodulated transmitted carrier. This function can be achieved by a feedback loop, working from an error signal representing the offset between the frequency of the OLO 13 and the estimated frequency of the unmodulated transmitted carrier.

Such an error signal is present at the input 57 to the VCO 50 from the Costas loop. An important characteristic of an AFC loop as opposed to a phase locked loop is that the control bandwidth can be much lower, so that the difficulties present when controlling an OLO using a phase locked loop are alleviated.

In a preferred embodiment, the image reject architecture could be implemented as an MMIC (monolithic microwave integrated circuit). This is shown in FIG. 4 wherein the components included within the dashed lines are implemented on a GaAs MMIC. The direct digital synthesis (DDS) components are excluded as they comprise off the shelf silicon. A key advantage of the present invention is the improvement in channel matching by having identical components with identical characteristics in each arm, and this is particularly achievable on a chip.

The invention claimed is:

1. A coherent optical intradyne receiver comprising an optical image reject mixer capable of dividing, mixing and recombining signals from three inputs so as to produce an inphase and a quadrature channel, from each of which channels, phase modulated signals can be recovered, wherein each of the channels is derived from all three of the inputs, and wherein each of the channels is obtained by mixing a set of signals derived from all three of the inputs with local oscillator signals, and combining the mixed signals, and wherein each of the channels is obtained from an identical set of signals.

2. A coherent optical intradyne receiver as claimed in claim 1 further comprising a three fiber coupler, at which an optical signal can be received and from which three outputs are obtained, said three outputs comprising the inputs to the optical image reject mixer.

3. A coherent optical intradyne receiver as claimed in claim 1, wherein a same set of image products is cancelled from each of said channels.

4. Image reject mixer suitable for a coherent optical intradyne receiver, the image reject mixer comprising
a divider to divide each of three detected inputs into two signal paths;
a local oscillator;
six four quadrant mixers, at each of which one of the six signal paths is mixed with one of six outputs from said local oscillator so as to create phase differences between said six signal paths;
a combiner to combine the six signal paths in two groups of three so as to create an inphase channel and a quadrature channel; and
a demodulator to demodulate phase modulated signals from said inphase and quadrature channels.

5. Image reject mixer as claimed in claim 4 wherein said three detected inputs comprise three outputs of a three fibre coupler.

6. Image reject mixer as claimed in claim 4 in which said phase differences are substantially 0, 120, and −120 degrees on an inphase arm and substantially 90, 210 and −30 on a quadrature arm.

7. Image reject mixer as claimed in claim 4 in which said phase modulated signals are BPSK or QPSK modulated signals.

8. Method of image rejection in an intradyne coherent optical receiver comprising the steps of:
dividing each of three detected inputs into two signal paths;
mixing each of the six signal paths with one of six outputs from a local oscillator so as to create phase differences between said six signal paths;
combining the six signal paths in two groups of three so as to create an inphase channel and a quadrature channel; and
demodulating phase modulated signals from said inphase and quadrature channels.

9. Method of image rejection in an intradyne coherent optical receiver as claimed in claim 8 wherein said three detected inputs comprise three outputs of a three fibre coupler.

10. Method of image rejection in an intradyne coherent optical receiver as claimed in claim 8, wherein the dividing, mixing and combining are implemented using analogue circuitry.

11. Image reject mixer suitable for a coherent optical intradyne receiver, the image reject mixer comprising
a differential amplifier to combine two of three detected inputs into one signal path;
means to divide each of the signal path from said differential amplifier and the remaining detected input into two signal paths;
a local oscillator;
four mixers, at each of which one of the four signal paths is mixed with one of four outputs from said local oscillator so as to create phase differences between said four signal paths;
means to combine the four signal paths in two groups of two so as to create an inphase channel and a quadrature channel; and
means to demodulate phase modulated signals from said inphase and quadrature channels.

12. Image reject mixer as claimed in claim 11 wherein said three detected inputs comprise three outputs of a three fibre coupler.

13. Image reject mixer as claimed in claim 11 in which said phase modulated signals are BPSK or QPSK modulated signals.

14. A method of coherently detecting an input optical signal, comprising:
optically mixing a first local oscillator with the signal to produce at least three mixed signals representing at least three distinct phases;
processing a first set of signals which comprises a combination of all of the at least three mixed signals to produce an in-phase channel; and
processing a second set of signals which comprises a combination of all of the at least three mixed signals to produce a quadrature channel,
wherein the processing comprises mixing each set of signals with respective local oscillator signals of a second local oscillator, and combining the mixed signals.

15. A method as claimed in claim 14, wherein the first set of signals is identical to the second set of signals.

16. A method as claimed in claim 14, wherein the first local oscillator is tuned such that the mixing is intradyne.

17. A method as claimed in claim 14, wherein the processing is analogue.

* * * * *